(12) United States Patent
Ramirez et al.

(10) Patent No.: US 7,905,693 B2
(45) Date of Patent: Mar. 15, 2011

(54) SPACER USING SPACING BAGS AND METHOD FOR LOADING TUBE PACKS ON RAILCARS

(75) Inventors: Efren Ramirez, Whittier, CA (US);
Stanley Curtis Whittemore, La Habra, CA (US)

(73) Assignee: Western Tube & Conduit Corporation, Long Beach, CA (US)

( * ) Notice: Subject to any disclaimer, the term of this patent is extended or adjusted under 35 U.S.C. 154(b) by 196 days.

(21) Appl. No.: 12/242,447

(22) Filed: Sep. 30, 2008

(65) Prior Publication Data
US 2009/0324358 A1 Dec. 31, 2009

Related U.S. Application Data

(60) Provisional application No. 61/076,558, filed on Jun. 27, 2008.

(51) Int. Cl.
*B61D 45/00* (2006.01)

(52) U.S. Cl. ..................... 410/119
(58) Field of Classification Search ............... 410/119, 410/31, 32, 34, 36, 37, 38, 39, 40, 42, 98; 105/355
See application file for complete search history.

(56) References Cited

U.S. PATENT DOCUMENTS

| | | | |
|---|---|---|---|
| 3,462,027 A * | 8/1969 | Puckhaber | 410/119 |
| 6,722,828 B2 | 4/2004 | French | |
| 7,381,020 B1 * | 6/2008 | Terao et al. | 410/42 |
| 7,381,021 B1 | 6/2008 | Tereo et al. | |
| 7,458,756 B2 * | 12/2008 | Ramirez et al. | 410/98 |

* cited by examiner

*Primary Examiner* — Hilary Gutman
(74) *Attorney, Agent, or Firm* — Foley & Lardner LLP

(57) ABSTRACT

A method and apparatus for loading tube bundles on a railcar includes placing the tube bundles lengthwise on the car and stacked above the car to form packs. These packs are spaced longitudinally one from another on the car. Spacing bags are placed within the longitudinally extending spaces. Plates are displaced one from another by the spacing bags to push against the ends of the packs.

23 Claims, 2 Drawing Sheets

SPACER USING SPACING BAGS AND METHOD FOR LOADING TUBE PACKS ON RAILCARS

CROSS-REFERENCE TO RELATED APPLICATIONS

This application claims priority to U.S. Provisional Application Ser. No. 61/076,558, filed Jun. 27, 2008, entitled "SPACER USING SPACING BAGS AND METHOD FOR LOADING TUBE PACKS ON RAILCARS", the contents of which are incorporated by reference herein.

FIELD OF THE INVENTION

The field of the present invention is related to systems and methods for loading railcars.

BACKGROUND OF THE INVENTION

The rail industry has a great deal of experience in the handling materials on railcars. Particular requirements have been established for stacking materials on flat cars including dunnage, blocking and specific strapping requirements.

With bundled and elongate products such as tubing, wood beams are laid laterally across the car as dunnage to support the bundles as shown in FIG. 1. The tubes are in bundles and extend longitudinally on the railcar. Short stakes, blocking and strapping them retains the load in place. FIG. 2 illustrates one such recommended stacking.

In spite of these carefully defined methods for retaining tube bundles, the natural vibration of the railcar can result in individual tubes in the bundle slowly working longitudinally outwardly from the bundle, telescoping outward. If left unattended, the individual tubes can extend into harms way or come into contact with adjacent tube bundles or bulkheads. This can make the bundles difficult to unload and cause damage to the tubing. Naturally, bulkheads can be placed against the ends of the tubing or the tubing against barriers. However, such tight assemblies create their own problems in terms of loading, unloading and damage from motion of the tubes relative to other tubes, the bulkheads and barriers.

Currently, a wooden spacing block is used to separate one bundle of tubes on a railcar from another bundle. The spacing block is constructed of two wooden plates with wood blocks between the two wooden plates. In order to use the wood blocks the distance between the two plates is measured and the wood blocks are inserted and hammered between the two plates. In many instances a significant amount of time and effort to nail down the wooden blocks. The spacing block system is described in greater detail are spent with regards to the methods of U.S. Pat. No. 7,381,021 entitled "Method For Loading Tube Bundles on Railcars".

SUMMARY

The present invention is directed to a method and apparatus for securing tube bundles on a railcar. The tube bundles are placed lengthwise on the bed of the railcar and stacked conventionally above the bed to form packs of multiple tube bundles. Spaces are left between adjacent packs of tube bundles. An assembly using spacing, air filled bags and plates displaced from one another by the bags can be positioned in the space between adjacent ends of tube bundles. The spacing air filled bags are positioned on the bed between longitudinally adjacent packs and in one embodiment can be fixed to the bed of the railcar. Accordingly, the assembly can provide an improved method and apparatus for loading tube bundles on a railcar. Other and further objects and advantages will appear hereinafter.

DETAILED DESCRIPTION OF THE PREFERRED EMBODIMENTS

A railcar, generally designated 10, includes a bed 12 and bulkheads 14, 16. The bulkheads 14, 16 are shown to be at either end of the bed 12. The railcar also includes standard railroad trucks, couplings and equipment (not shown).

Figure 1:
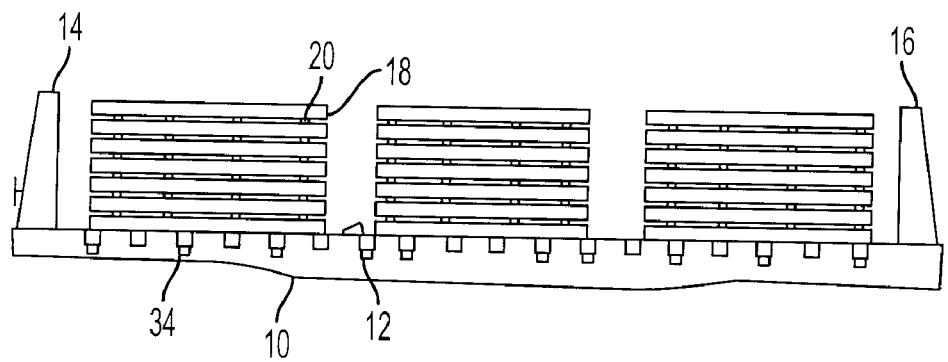
FIG. 1 is a side view of a railcar with tube bundles stacked thereon as in the prior art.
Figure 2:
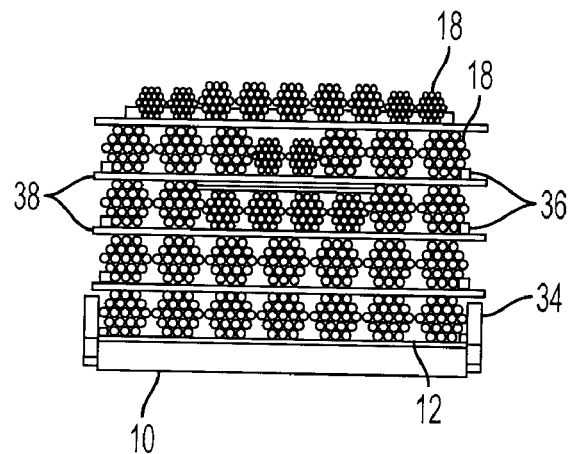
FIG. 2 is an end view of the prior art stacked tube bundles of FIG. 1.

Tube bundles 18 are shown placed on the bed 12 in accordance with standard practice. One such example of approved tube bundle stacking is illustrated in FIG. 2 which shows the packing of various sizes of tube bundles 18. Typically the tube bundles 18 are placed on the bed 12 by forklifts, but can be placed using other suitable means. The tube bundles 18 are arranged with spaces extending longitudinally therebetween. Conveniently, the packs of tube bundles 18 are also spaced away from the bulkheads 14,16. With this spacing, the bundles 18 can be easily and quickly loaded and unloaded from the bed 12 of the railcar 10. Strapping 20 can be used tie each of packs of tube bundles 18 to the bed 12 of the railcar 10. Stakes 34 can be used to prevent rolling of the packs of tube bundles 18.

Figure 4:
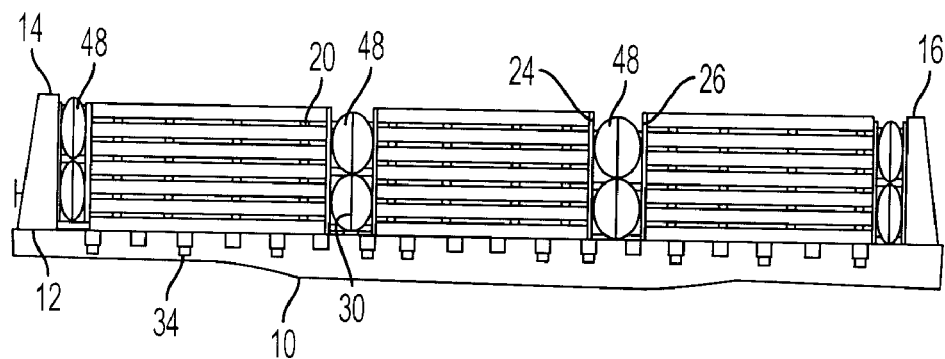
FIG. 4 is a side view of a railcar with tube bundles and one embodiment of the spacer apparatus of this invention.
Figure 3:
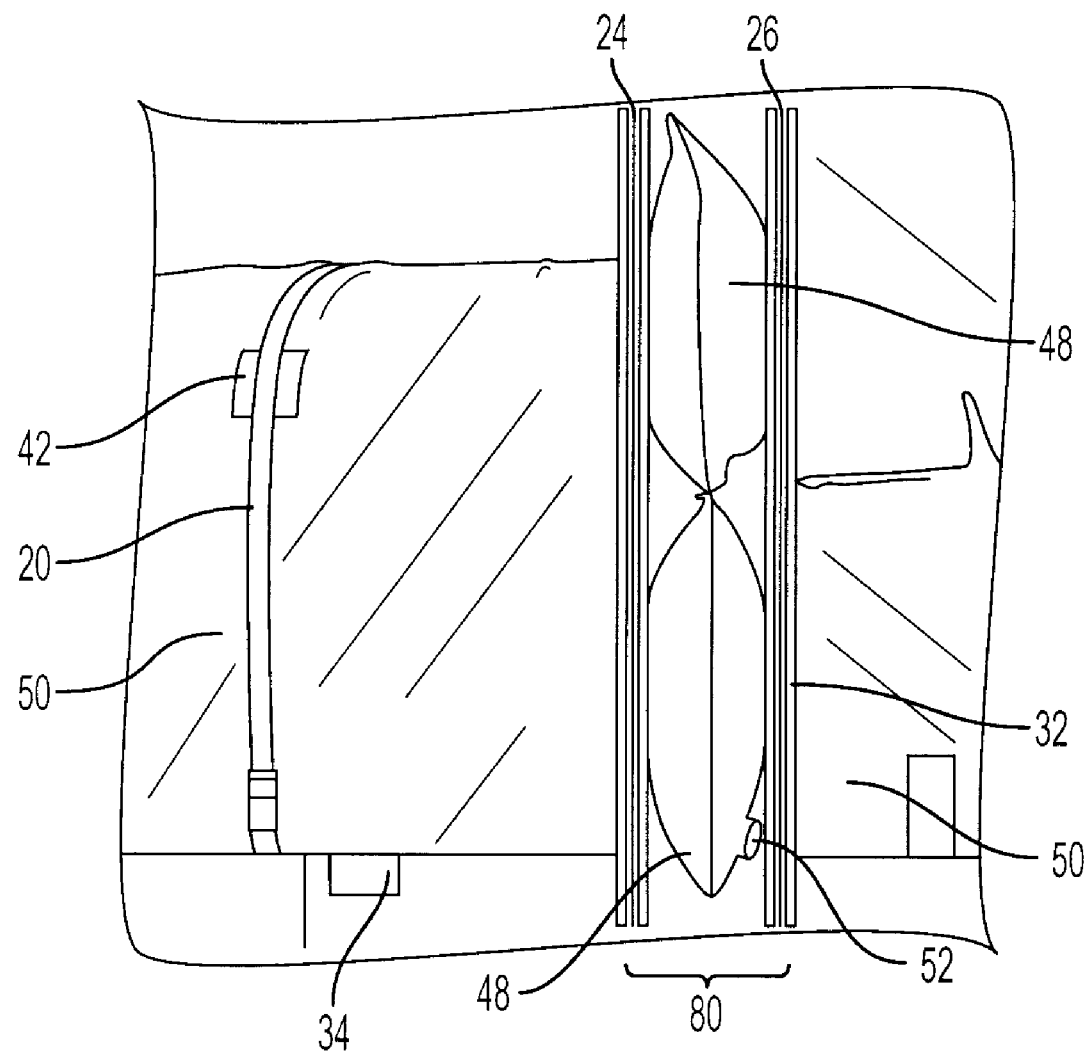
FIG. 3 is a perspective view of one embodiment of the apparatus of this invention using spacing bags.

In a first embodiment of the present invention as shown in FIGS. 3 and 4, a spacer 80 can occupy the space between the packs of tube bundles. The spacer 80 can be constructed such that it cushions, protects and prevents damage to the packs of tube bundles 18, bed 12, bulkheads 14 and 16 and areas surrounding railcar as it travels. Another function of the spacer 80 can be to prevent telescoping of any one or plurality of tubes in the pack of tube bundles 18. Spacer 80 can prevent loose tubes in the tube bundles 18 from interfering with adjacent structure or elements and prevent difficulties in off-loading tube bundles. The spacer 80 may be configured to fit within the space between tube bundles 18 vertically in the railcar 10 between longitudinally adjacent packs of tube bundles 18 and between the bulkheads 14, 16 and the most adjacent packs of tube bundles 18.

In the first embodiment, the spacer 80 can includes a plurality of plates 24 and 26, and at least one spacing bag 48. The plates 24 and 26 can be constructed of a plurality of separate plates that are rigid. For example plates 24 and 26 can be made from wood, metal, pressed wood, plastic or the like. Spacing bag 48 can be an inflatable bag created from a flexible material such as for example plastics, polymers, cloth or polyurethane. In other embodiments, the spacing bag 48 can be constructed out of a dual layer material, where the inner layer acts as the bladder receiving the air and the outer layer is constructed from a more resilient material to prevent puncturing. The spacing bag 48 can have a length and a width dimension and have an inseam running along the perimeter of the spacing bag 48. The spacing bag 48 is not limited to the shape as shown and can be rectangular, circular, rounded or shaped to accommodate particular objects.

The spacing bag 48 and the plates 24 and 26 are initially adjusted to be thinner than the space into which the spacer 80 is placed, specifically to facilitate placement of the spacer 80 on the bed 12 between packs of tube bundles 18 and/or bulkheads 14, 16. The spacing bag 48 may be employed to define the displacement of the rigid plates 24 and 26. A deflated spacing bag 48 or a partially inflated spacing bag 48 can be inserted between the plates 24 and 26. Inflating or filling the spacing bag 48 can displace the two plates 24 and 26 away from each other and against the wall of the tube packs. The spacing bag 48 can be inflated using a gas or a fluid, such as but not limited to, compressed air, helium, water or the like. In the first embodiment the spacing bag 48 is inflated with air until it exerts pressure on the pates 24 and 26 and thereby the spacer 80 exerts pressure on packs of tubes 18. The pressure inside the spacing bag can be about 7 to 12 P.S.I. In an alternative embodiment the spacing bag can be inflated to about 10 P.S.I.

In a second embodiment the spacer 80 can include plates 24 and 26 covered on at least one side with a cushioning material 32. To ensure that the ends of the tubes coming into contact with the spacer 80 will not be injured by vibrations against the plates 24 and 26, a cushioning material 32 can be placed on the surfaces of the plates 24 and 26. These cushions may be applied by any means including gluing or stapling or placement without begin affixed to the plates. The cushioning material 32 can be made of a plurality of material, for example, foam, plastic, carpet or burlap. In an alternative embodiment, the cushioning material 32 can be on both sides of the plates 24 and 26, to provide a cushion for the spacing bag 48.

In a third embodiment shown in FIG. 4, strapping 30 can extend over the spacing bag 48 which lies along the peripheral edge of the plates 24, 26 and set in adjacent to the bed 12 of the railcar 10.

The overall process of loading tube bundles 18 includes placing the tube bundles on a flat car 10. Stakes 34 on the edges of the flat car 10 and blocks 36 against the bundles 18 insure the bundles 18 do not roll from the car 10. Wood beams 38 are placed between bundles as dunnage. Strapping 20 can tie the load down. The spacer 80 can be positioned on the bed 12 of the railcar 10 in the longitudinal space between bundle ends. The entire load may be covered by using covering 50. The covering 50 can be a flexible material, such as but not limited to, tarp, plastic, polymers, polyurethane, capable of deflecting debris during transportation of the rail car 10. The covering 50 can protect the spacer 80 and the spacing bag 48 from being struck by various objects during transport.

In a fourth embodiment, plates 24 and 26 can be placed along the sides of two adjacently spaced tube bundles 18. The rigid plates 24 and 26 can be covered on both side with a cushioning material 32. Next a deflated spacing bag 48 can be placed between the two plates 24 and 26 and placed near the railcar bed 12. The spacing bag 48 can include a value 52 to allow a device, such as a pump or compressor, to insert gases or fluid into the spacing bag 48. The pump can insert air into a spacing bag 48 to about 8 to 12 P.S.I., preferably 10 P.S.I. The inflated spacing bag 48 can exert pressure against plates 24 and 26. If needed, spacing bag 48 can be further inflated to exert greater pressure against rigid plates 24 and 26. In one embodiment the spacing bag 48 can exert sufficient pressure against the tubing bundles so that when they are tied with strapping 20 this creates a single unit out of a plurality of tubing bundles 18. In an alternative embodiment a second spacing bag 48 can be placed on top of the first spacing bag if the rigid plates 24 and 26 height allow space for the second spacing bag 48. The second spacing bag 48 can be inflated using a valve 52. In another embodiment, the rigid plates 24 and 26 can be coupled to the railcar for further security by nails, screws or the like (not shown).

The inflation of a spacing bag 48 can take up to 3 minutes depending on the pump used, preferably less than 2 minutes. To disassemble the spacer 80 created by the inflation spacing bag 48 the valve can be opened to release the air out of the spacing bag 48. Deflating the spacing bag 48 reduces the pressure against plates 24 and 26 allowing their removal and access to the pack of tube bundles 18.

According to a fifth embodiment of the current invention, each component of the spacer 80 can be assembled away from the railcar 10. The spacer 80 can have two plates 24 and 26, coupled to one another using a flexible means, such as but not limited to, a cloth, plastic or tarp which would wrap around or over the plates (not shown). The flexible means can be attached to each of the plates at the perimeter of the plate. At least one spacing bag 48 can be inserted between plates 24 and 26 and inside the perimeter created by the flexible means. A valve to allow the inflation of the spacing bags 48 can be located outside the flexible means. The plates 24 and 26 can be covered on both sides with the cushioning material 32. In an alternative embodiment the cushioning material can be used as the flexible means to connect the plates 24 and 26 (not shown). For example, plastic could be nailed to the bottom outer surface of each plate and extend over the top to encompass the bags 48.

The spacer 80 can be partially inflated prior to its placement on the railcar bed 12. After the placement of the packs of bundles of tubes 18, the spacer 80 of the fifth embodiment can be inserted into the space between the bundles of tubes 18. A pump or compressor can be connected to the valve and the spacing bag 48 or plurality of spacing bags can be inflated to the appropriate pressure. During the inflation the flexible means can stretch or be sufficiently loose to allow the plates 24 and 26 to exert pressure on the bundles of tubes 18 when fully inflated. Using this method can reduce assembly time.

In a sixth embodiment, the spacer 80 can have spacing bags 48 that are affixed to the plates 24 and 26. The spacer 80 with partially deflated spacing bags 48 can be inserted into the space between two sets of packs of bundles of tubes 48. Next the spacing bags 18 can be inflated to exert outward pressure on the packs of bundles of tubes 48. In alternative embodiments multiple spacing bags can be used in one spacer 80.

Accordingly, an improved system for loading tube bundles on a railcar has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for loading tube bundles on a railcar having a bed, comprising:

placing the tube bundles lengthwise on the bed placing at least one plate adjacent to a longitudinal end of the tube bundles and, inflating at least one spacing bag adjacent to the at least one plate.

2. The method of claim 1 further comprising placing resilient material on at least one side of the at least one plate.

3. The method of claim 2 wherein the resilient material comprises a cushioning material.

4. The method of claim 3 wherein the cushioning material is applied to both sides of the at least one plate.

5. The method of claim 1 further comprising partially deflating the at least one spacing bag prior to inflating the at least one spacing bag adjacent to the at least one plate.

6. The method of claim 5 wherein the at least one spacing bag is inflated to about 7 to 12 PSI.

7. The method of claim 5 wherein the at least one spacing bag is inflated to about 10 PSI.

8. The method of claim 1 further comprising providing strapping at the bed of the rail car and the strapping extending over the spacing bag.

9. The method of claim 8 wherein the strapping extends over the at least one plate positioned between the spacing bag and the tube bundles.

10. The method of claim 8 wherein the at least one spacing bag is inflated to exert pressure against the tube bundles so that a semi-rigid unit is created.

11. The method of claim 1 further comprising securing a covering to the rail bed and extending the covering over the tube bundles and the spacing bag.

12. The method of claim 1 further comprising a second spacing bag that is placed above the at least one spacing bag and inflated to apply pressure against the tube bundles.

13. The method of claim 1 wherein the at least one plate is rigid and is coupled to the rail car bed.

14. The method of claim 1 wherein the at least one plate is coupled to the spacing bag.

15. The method of claim 14 wherein the at least one plate is placed on at least two sides of the spacing bag.

16. The method of claim 15 wherein the at least one plate is secured by a flexible material.

17. The method of claim 16 wherein the spacing bag is inflated to exert pressure against the tube bundles.

18. The method of claim 15 wherein the spacing bag and the at least one plate comprises a unit which is inserted between ends of the tube bundles; and
    inflating the spacing bag to push the at least one plate against the ends of the tube bundles.

19. A method of loading tube bundles on a rail car having a bed and bulkheads, comprising:
    placing a first and a second tube bundle lengthwise on the bed;
    placing at least two plates between the first and the second tube bundle; and
    inflating at least one spacing bag between the at least two plates to push the at least two plates against the first and second tube bundles.

20. A method to loading tube bundles on a rail car having a bed and bulkheads, comprising:
    placing tube bundles lengthwise on the bed
    placing at least one plate adjacent to a longitudinal end of the tube bundles; and
    partially deflating at least one spacing bag prior to inflating the at least one spacing bag adjacent to the at least one plate.

21. A method of loading bundles on a rail car having a bed and bulkheads, comprising:
    placing tube bundles lengthwise on the bed and placing at least one plate adjacent to the tube bundles;
    inflating at least one spacing bag adjacent to the at least one plate; and,
    securing strapping to the bed of the rail car and extending the strapping over the top of a spacing bag.

22. A method for loading material on a rail car having a bed, comprising:
    placing two tube bundles lengthwise on the bed; and
    placing a first and a second spacing bag between the first and the second tube bundles and inflating a spacing bag to exert pressure against the first and the second tube bundles.

23. A method of loading material on a rail car having a bed, comprising:
    placing tube bundles lengthwise on the bed and providing a spacing bag and at least one plate;
    inserting the spacing bag and the at least one plate adjacent to the tube bundles; and
    inflating the spacing bag to push the at least one plate against the tube bundles.

* * * * *